United States Patent
Nakazono et al.

(10) Patent No.: US 12,055,348 B2
(45) Date of Patent: Aug. 6, 2024

(54) HEAT EXCHANGE APPARATUS AND METHOD OF MANUFACTURING THE SAME

(71) Applicant: Mitsubishi Electric Corporation, Tokyo (JP)

(72) Inventors: Junichi Nakazono, Tokyo (JP); Shunkei Suzuki, Tokyo (JP); Yasumitsu Nomura, Tokyo (JP); Yoshikazu Yaji, Tokyo (JP); Minoru Sato, Tokyo (JP); Seiji Maruyama, Tokyo (JP); Yuichi Usuda, Tokyo (JP); Norihiro Yoneda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 368 days.

(21) Appl. No.: 17/428,281

(22) PCT Filed: Apr. 3, 2019

(86) PCT No.: PCT/JP2019/014812
§ 371 (c)(1),
(2) Date: Aug. 4, 2021

(87) PCT Pub. No.: WO2020/202499
PCT Pub. Date: Oct. 8, 2020

(65) Prior Publication Data
US 2022/0107142 A1 Apr. 7, 2022

(51) Int. Cl.
*F28D 20/02* (2006.01)
*F28D 20/00* (2006.01)

(52) U.S. Cl.
CPC .... *F28D 20/021* (2013.01); *F28D 2020/0069* (2013.01); *F28D 2020/0078* (2013.01); *F28D 2020/0082* (2013.01)

(58) Field of Classification Search
CPC ..... F28D 2020/0021; F28D 2020/0069; F28D 2020/0078; F28D 2020/0082; F28D 20/02; F28D 20/021
See application file for complete search history.

(56) References Cited

U.S. PATENT DOCUMENTS

| | | | |
|---|---|---|---|
| 4,491,172 A | * | 1/1985 | Hitchin ................. F28F 13/125 126/618 |
| 4,609,036 A | * | 9/1986 | Schrader ............... F28D 20/021 126/618 |

(Continued)

FOREIGN PATENT DOCUMENTS

| | | | |
|---|---|---|---|
| CN | 108088297 A | | 5/2018 |
| EP | 2941612 B1 | * | 8/2019 ........... F28D 20/003 |

(Continued)

OTHER PUBLICATIONS

Office Action issued Jun. 27, 2023 in corresponding Chinese Patent Application No. 201980094046.5 with machine English Translation thereof, 9 pages.

(Continued)

*Primary Examiner* — Nelson J Nieves
(74) *Attorney, Agent, or Firm* — XSENSUS LLP

(57) ABSTRACT

Provided herein are a heat exchange apparatus intended to achieve compatibility between installation flexibility and durability and a method of manufacturing the heat exchange apparatus. The heat exchange apparatus is a heat exchange apparatus that exchanges heat between a heat storage material and a fluid. The heat exchange apparatus includes a first heat storage module and a second heat storage module, each having the heat storage material and a box-like shape, and a housing containing the first heat storage module and the second heat storage module. The first heat storage module is disposed in the same orientation as that of the second heat storage module.

6 Claims, 2 Drawing Sheets

(56) References Cited

U.S. PATENT DOCUMENTS

| | | | | |
|---|---|---|---|---|
| 5,524,453 | A | * | 6/1996 | James .................. F28D 20/023 62/436 |
| 10,900,667 | B2 | * | 1/2021 | Field ...................... F24S 10/45 |
| 2012/0227926 | A1 | * | 9/2012 | Field ...................... F24S 10/95 165/157 |
| 2015/0192370 | A1 | * | 7/2015 | Suzuki ................. F28D 20/021 165/10 |
| 2016/0195340 | A1 | * | 7/2016 | Bissell ................. F28D 20/021 165/10 |
| 2016/0216044 | A1 | * | 7/2016 | Narine ................. F28D 20/021 |
| 2018/0003445 | A1 | | 1/2018 | Bergan et al. |
| 2018/0195741 | A1 | * | 7/2018 | Field ...................... F24D 11/003 |
| 2019/0072338 | A1 | * | 3/2019 | Wirz ...................... F28D 17/04 |
| 2021/0010758 | A1 | * | 1/2021 | Chopard ............... F28D 20/028 |
| 2021/0172685 | A1 | * | 6/2021 | Bergan ................. F28D 20/028 |

FOREIGN PATENT DOCUMENTS

| | | | |
|---|---|---|---|
| JP | 60251392 | A * | 12/1985 |
| JP | 2004-271001 | A | 9/2004 |
| JP | 2007-198717 | A | 8/2007 |
| JP | 2011-202894 | A | 10/2011 |
| JP | 2017-96552 | A | 6/2017 |
| WO | 2014/106597 | A1 | 7/2014 |
| WO | 2017/108579 | A1 | 6/2017 |

OTHER PUBLICATIONS

International Search Report and Written Opinion mailed on Jun. 18, 2019, received for PCT Application PCT/JP2019/014812, Filed on Apr. 3, 2019, 10 pages including English Translation.

Extended European search report issued on Feb. 18, 2022, in corresponding European patent Application No. 19922424.7, 7 pages.

Office Action issued Mar. 25, 2023 in corresponding CN patent application No. 201980094046.5 with computer-generated English Translation thereof, 11 pages.

Office Action dated Dec. 29, 2022, issued in corresponding CN patent application No. 201980094046.5 (and 1 Machine Translation), 10pp.

* cited by examiner

HEAT EXCHANGE APPARATUS AND METHOD OF MANUFACTURING THE SAME

CROSS-REFERENCE TO RELATED APPLICATION

The present application is based on PCT filing PCT/JP2019/014812, filed Apr. 3, 2019, the entire contents of which are incorporated herein by reference.

TECHNICAL FIELD

The present disclosure relates to a heat exchange apparatus and a method of manufacturing the same, and more particularly, relates to a heat exchange apparatus including a heat storage material and a method of manufacturing the same.

BACKGROUND ART

Known heat exchange apparatuses exchange heat with tap water as a heat storage material. For example, a known heat exchange apparatus includes a tank that is used for hot water supply and that is filled with tap water as a heat storage material. Tap water for hot water supply is introduced into the tank and exchanges heat directly with the tap water as the heat storage material (refer to Patent Literature 1, for example). The tap water in the tank subjected to direct heat exchange is forced to flow out of the tank by tap water pressure and is supplied as hot water.

CITATION LIST

Patent Literature

Patent Literature 1: Japanese Unexamined Patent Application Publication No. 2011-202894

SUMMARY OF INVENTION

Technical Problem

In a heat exchange apparatus using direct heat exchange with tap water in a tank as described above, the tap water pressure of tap water is applied to the inside of the tank. To withstand the tap water pressure, a typical tank has a cylindrical shape.

However, a cylindrical tank included in a heat exchange apparatus may reduce installation flexibility of the heat exchange apparatus in terms of an installation space. For example, the cylindrical tank makes it difficult to effectively use a rectangular installation space. In contrast, if a typical heat exchange apparatus does not include a cylindrical tank, the heat exchange apparatus may decrease in durability due to the tap water pressure.

In response to the above issue, it is an object of the present disclosure to provide a heat exchange apparatus intended to achieve compatibility between installation flexibility and durability and a method of manufacturing the heat exchange apparatus.

Solution to Problem

An aspect of the present disclosure provides a heat exchange apparatus that exchanges heat between a heat storage material and a fluid. The heat exchange apparatus includes a first heat storage module and a second heat storage module, each having the heat storage material and a box-like shape, and a housing containing the first heat storage module and the second heat storage module. The first heat storage module is disposed in the same orientation as that of the second heat storage module.

Another aspect of the present disclosure provides a method of manufacturing a heat exchange apparatus that exchanges heat between a heat storage material and a fluid. The method includes a module preparing step of preparing a first heat storage module and a second heat storage module each having the heat storage material and a box-like shape, a housing preparing step of preparing a housing to contain the first heat storage module and the second heat storage module, and an arranging step of arranging the prepared first and second heat storage modules in the same orientation in the housing.

Advantageous Effects of Invention

The above aspect of the present disclosure provides the heat exchange apparatus including the first and second box-shaped heat storage modules, each having the heat storage material, arranged in the same orientation in the housing. In the heat exchange apparatus, the heat storage modules have the box-like shape, which ensures installation flexibility. In addition, the heat storage modules have the heat storage material, which avoids tap water pressure, leading to improved durability.

DESCRIPTION OF EMBODIMENTS

Embodiments of a heat exchange apparatus disclosed in the present application will be described below with reference to the accompanying drawings. Note that the following embodiments are merely examples and should not be construed as limiting the present disclosure.

Embodiment 1

Figure 1:
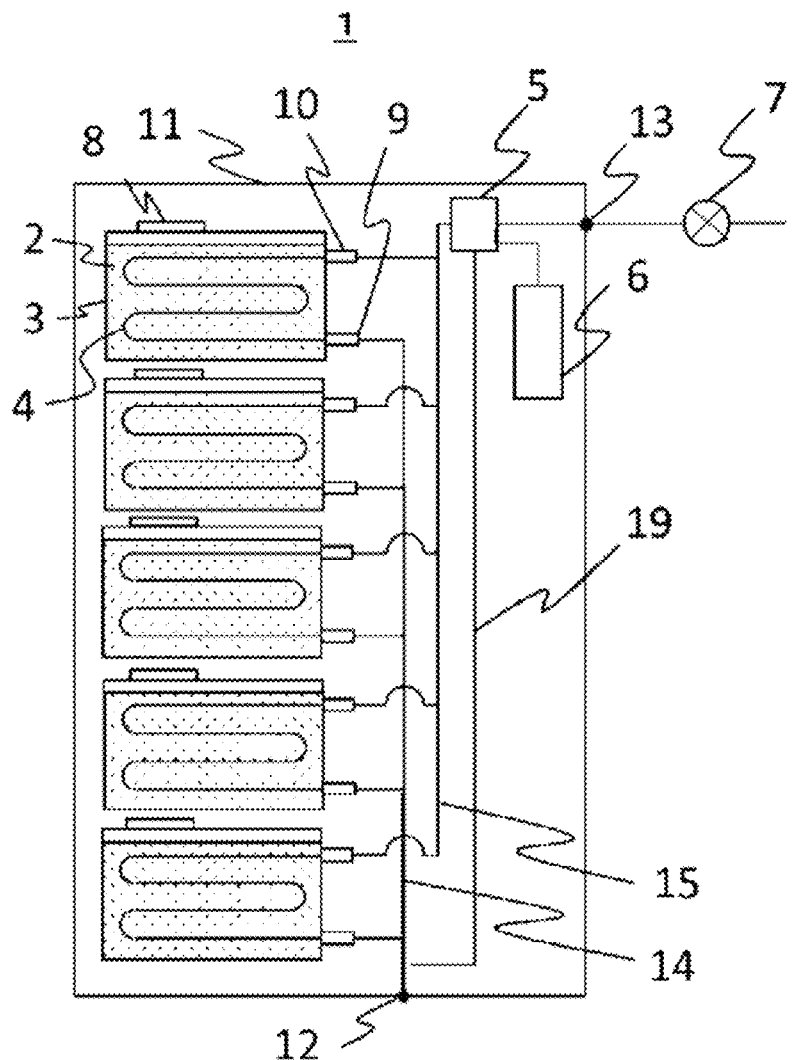
FIG. 1 is a schematic diagram illustrating the configuration of a heat exchange apparatus according to Embodiment 1.

FIG. 1 is a schematic diagram illustrating the configuration of a heat exchange apparatus according to Embodiment 1. A heat exchange apparatus 1 includes a heat storage material 2, a plurality of heat storage modules 3 each having the heat storage material 2, a regenerative heat exchanger 4 located in each of the heat storage modules and exchanging heat with the heat storage material 2, and a housing 11 containing the above-described components. The heat exchange apparatus 1 functions as a regenerative water heater that adjusts the temperature of tap water flowing through the heat exchange apparatus 1 to supply hot water.

The heat storage material 2 is in contact with the regenerative heat exchanger 4. The heat storage material 2 is a heat storage medium that transfers heat to the tap water flowing through a passage in the heat exchange apparatus 1 to heat the tap water, with the regenerative heat exchanger 4 therebetween. Furthermore, the heat storage material 2 is a heat storage medium that receives heat from a heat medium flowing through the passage in the heat exchange apparatus 1 to store the heat, with the regenerative heat exchanger 4 therebetween. Preferable examples of the heat storage material 2 include water, oil, antifreeze, paraffin, sodium acetate trihydrate, and erythritol. These materials have a large amount of heat (heat storage density) per unit volume, which leads to improved temperature adjustment performance of the heat exchange apparatus 1.

Each heat storage module 3 includes the heat storage material 2, which is a heat storage medium, and the regenerative heat exchanger 4 allowing the tap water to flow through the heat storage module 3. The heat storage material 2 is provided in the heat storage module 3. Increasing the area of contact between the heat storage material 2 and the regenerative heat exchanger 4 enables efficient heat exchange.

The heat storage module 3 is a box-shaped container that contains the heat storage material 2 and the regenerative heat exchanger 4. The box-shaped heat storage module 3 has, in one surface thereof, a heat-storage-material inlet 8 through which the heat storage material 2 is received. Preferable examples of a material for the heat storage module 3 include stainless steel, aluminum, copper, polycarbonate, and resin. These materials have high heat resistance, which leads to improved heat storage performance.

The regenerative heat exchanger 4, which is a tubular part, is a heat exchanger that exchanges heat between the tap water or the heat medium flowing therethrough and the heat storage material 2. The regenerative heat exchanger 4 is made of a metallic material, such as stainless steel, aluminum, or copper. Such a material can improve the efficiency of heat exchange of the regenerative heat exchanger 4.

In the example described above, the regenerative heat exchanger 4 is made of a metallic material. The present disclosure, however, is not limited to this example.

The regenerative heat exchanger 4 may be made of a lightweight material, such as plastic or resin. The use of such a lightweight material achieves weight reduction of the heat storage module 3, resulting in a reduction in overall weight of the heat exchange apparatus 1 including the multiple heat storage modules 3. This can facilitate installation of the heat exchange apparatus 1.

The regenerative heat exchanger 4 has a heat-exchange-water inlet 9, through which the tap water flows into the regenerative heat exchanger 4, and a heat-exchange-water outlet 10, through which the tap water flows out of the regenerative heat exchanger, and heat transfer tubes 18 exchanging heat with the tap water. The heat-exchange-water inlet 9 functions as an inlet that guides a fluid, which is guided from the outside of the housing 11 into the housing 11, into the heat storage module 3. The regenerative heat exchanger 4 is located in the heat storage module 3. The heat-exchange-water inlet 9 protrudes from one side of the heat storage module 3. The heat-exchange-water outlet 10 protrudes from the same side of the heat storage module 3 as that from which the heat-exchange-water inlet 9 protrudes. The heat-exchange-water outlet 10 functions as an outlet that guides the fluid guided into the heat storage module 3 to the outside of the heat storage module 3.

For a concrete structure of the regenerative heat exchanger 4, the regenerative heat exchanger 4 may be a tube-fin heat exchanger including a plurality of cylindrical tubes or may be a plate heat exchanger including a plurality of flat plates.

In the above-described case in the above example, the heat-exchange-water inlet 9 and the heat-exchange-water outlet 10 are used, and the heat storage material 2 transfers heat to the tap water flowing through the passage in the heat exchange apparatus 1 to heat the tap water. In the case where the heat storage material 2 receives heat from the heat medium flowing through the passage in the heat exchange apparatus 1 to store the heat, the heat-exchange-water inlet 9 functions as a part that causes the heat medium to flow out of the regenerative heat exchanger 4, and the heat-exchange-water outlet 10 functions as a part that causes the heat medium to flow into the regenerative heat exchanger 4.

The housing 11 is a box-shaped housing that contains the multiple heat storage modules 3. The housing 11 is made of a metallic material, such as stainless steel, aluminum, or copper, or a lightweight material, such as plastic or resin, and is formed by thin plate working, for example.

In the housing 11, the multiple heat storage modules 3 are oriented in the same direction and are stacked vertically. In other words, a first heat storage module 3 of the multiple heat storage modules 3 is disposed in the same orientation as that of a second heat storage module 3. Specifically, for an aggregate including one heat storage module 3 and another heat storage module 3, the heat-exchange-water inlet 9 of the one heat storage module 3 and that of the other heat storage module 3 are located in the same side of the aggregate. In other words, the heat-exchange-water inlet 9 of the one heat storage module 3 and that of the other heat storage module 3 are located adjacent to the same side of the housing 11. Furthermore, for an aggregate including one heat storage module 3 and another heat storage module 3, the heat-exchange-water outlet 10 of the one heat storage module 3 and that of the other heat storage module 3 are located in the same side of the aggregate. In other words, the heat-exchange-water outlet 10 of the one heat storage module 3 and that of the other heat storage module 3 are located adjacent to the same side of the housing 11. In the example of FIG. 1, the heat-exchange-water inlet 9 and the heat-exchange-water outlet 10 of one heat storage module 3 and the heat-exchange-water inlet 9 and the heat-exchange-water outlet 10 of another heat storage module 3 are located in the same side of the aggregate and are located adjacent to the same side of the housing 11.

The multiple heat storage modules 3 are oriented in the same direction and are stacked vertically in the housing 11 such that the respective protruding heat-exchange-water inlets 9 are located in the same side of the aggregate. This arrangement allows the aggregate including the protruding parts to have a smaller lateral footprint than an aggregate including the heat storage modules oriented in random directions and stacked vertically. The above-described configuration can ensure installation flexibility.

The multiple heat storage modules 3 are oriented in the same direction and are stacked vertically in the housing 11 such that the respective protruding heat-exchange-water outlets 10 are located in the same side of the aggregate. This arrangement allows the aggregate including the protruding parts to have a smaller lateral footprint than the aggregate including the heat storage modules oriented in random directions and stacked vertically. This can ensure that the heat exchange apparatus 1 has installation flexibility.

The housing 11 has a tap water inlet 12, which guides tap water to be heated into the heat exchange apparatus 1, and a tap water outlet 13, which guides the tap water heated through the heat exchange apparatus 1 to the outside of the heat exchange apparatus 1. The tap water inlet 12 is connected to the heat-exchange-water inlets 9 of the respective heat storage modules 3 by an inlet pipe 14. The tap water inlet 12 functions as a housing inlet that guides a fluid from the outside of the housing 11 into the housing 11. The tap water outlet 13 is connected to the heat-exchange-water outlets 10 of the respective heat storage modules 3 by an outlet pipe 15. The tap water outlet 13 functions as a housing outlet that guides the fluid guided into the housing 11 to the outside of the housing 11.

The inlet pipe 14 is a comb-shaped pipe including a main straight pipe portion extending vertically and a plurality of branch pipe portions extending laterally from the main straight pipe portion. The main straight pipe portion has a first end connected to the tap water inlet 12. The branch pipe portions each have a second end connected to the heat-exchange-water inlet 9 of the corresponding heat storage module 3.

The inlet pipe 14 is a pipe to supply the tap water from the tap water inlet 12 of the housing 11 to the heat storage modules 3, and is made of a metallic material, such as stainless steel, aluminum, or copper, or a lightweight material, such as plastic or resin. The comb-shaped inlet pipe 14 has, as the branch pipe portions, a plurality of connection ports that are equal in number to the heat storage modules 3 arranged in the housing 11 and that are arranged at regular intervals. The connection ports are connected to the heat-exchange-water inlets 9 of the respective heat storage modules 3.

The outlet pipe 15 is a comb-shaped pipe including a main straight pipe portion extending vertically and a plurality of branch pipe portions extending laterally from the main straight pipe portion. The main straight pipe portion has a first end connected to the tap water outlet 13. The branch pipe portions each have a second end connected to the heat-exchange-water outlet 10 of the corresponding heat storage module 3.

The outlet pipe 15 is a pipe to cause heat-exchange water subjected to heat exchange through the multiple heat storage modules 3 to join together, and is made of a metallic material, such as stainless steel, aluminum, or copper, or a lightweight material, such as plastic or resin. The comb-shaped outlet pipe 15 has, as the branch pipe portions, a plurality of connection ports that are equal in number to the heat storage modules 3 arranged in the housing 11 and that are arranged at regular intervals. The connection ports are connected to the heat-exchange-water outlets 10 of the respective heat storage modules 3.

In Embodiment 1 illustrated in FIG. 1, the inlet pipe 14 and the outlet pipe 15 are arranged adjacent to one side of the aggregate including the heat storage modules 3 stacked vertically. This arrangement allows the aggregate with the inlet pipe 14 and the outlet pipe 15 to have a smaller lateral footprint than the aggregate including the heat storage modules 3 oriented in random directions and stacked vertically. This can ensure that the heat exchange apparatus 1 has installation flexibility.

Each heat storage module 3 includes the regenerative heat exchanger 4 exchanging heat between the tap water and the heat storage material 2. Since the heat storage material 2 in the heat storage module 3 exchanges heat with the tap water, with the tubular regenerative heat exchanger 4 therebetween, the heat storage material 2 is not in contact with the tap water, or is isolated from the tap water. Such a configuration allows the heat exchange apparatus 1 including the heat storage modules 3, whose shape is not a cylinder, to maintain durability more easily than a heat exchange apparatus using direct heat exchange with tap water in a tank.

Each of the heat storage modules 3 stacked vertically has a box-like shape. This allows the housing 11 containing the stacked heat storage modules 3 to have a box-like shape. This can ensure that the heat exchange apparatus 1 has greater installation flexibility than a typical heat exchanger including a cylindrical tank.

In Embodiment 1 of FIG. 1, the heat exchange apparatus 1 includes the multiple heat storage modules 3 having the same structure and stacked in the housing 11. For installation of the heat exchange apparatus 1 with such a configuration at a target place, the heat storage modules 3 can be individually transported to the target place, assembled, and arranged in the housing, so that the heat exchange apparatus 1 can be installed at the target place. This configuration can ensure that the heat exchange apparatus 1 has greater installation flexibility and greater portability than a heat exchange apparatus including a single heat storage module containing the same amount of heat storage material as the total amount of heat storage material 2 in the aggregate including the stacked heat storage modules 3.

In Embodiment 1 of FIG. 1, the heat exchange apparatus 1 includes the multiple heat storage modules 3 having the same structure and stacked in the housing 11.

Therefore, the heat exchange apparatus 1 can be easily changed in design to achieve intended heat storage performance by adjusting the number of heat storage modules 3 to be stacked.

In the heat exchange apparatus 1, the heat storage material 2 in each heat storage module 3 exchanges heat with the tap water, with a heat transfer surface of the regenerative heat exchanger 4 therebetween, during hot water supply. The heat storage material 2 in the heat storage module 3 does not mix with the tap water. In the heat exchange apparatus 1, the regenerative heat exchanger 4, through which the tap water flows, experiences the tap water pressure, but the heat storage module 3 can be kept from experiencing the tap water pressure. Therefore, durability to withstand the tap water pressure, which is essential to the heat storage module 3 containing the heat storage material 2, can be designed to be lower than that of a typical heat exchange apparatus using direct heat exchange between tap water and a heat storage material in a tank. Thus, a box-like shape can be selected as the shape of the heat storage module 3. The use of the box-shaped heat storage module 3 allows the spacing between the heat storage module 3 and a corner of the housing 11 to be smaller than that in the use of a circular heat storage module, leading to a reduction in size of the housing 11.

Figure 2:
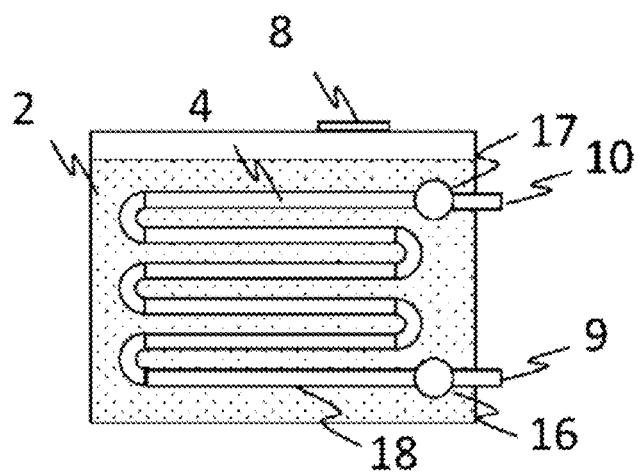
FIG. 2 is a schematic front view of a heat storage module.
Figure 3:
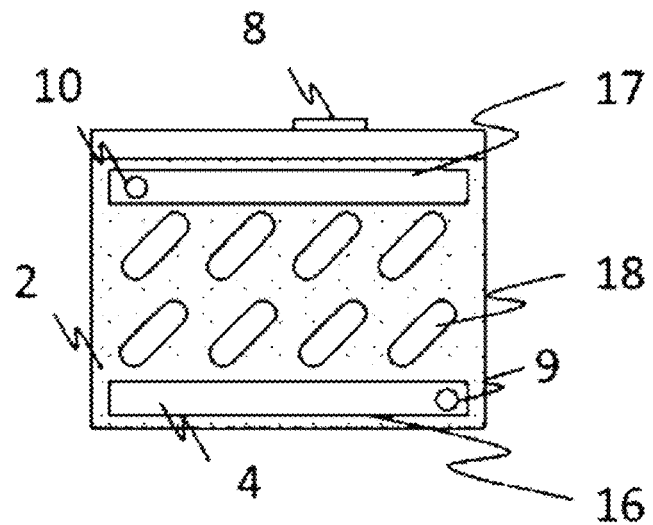
FIG. 3 is a schematic side view of the heat storage module.
Figure 4:
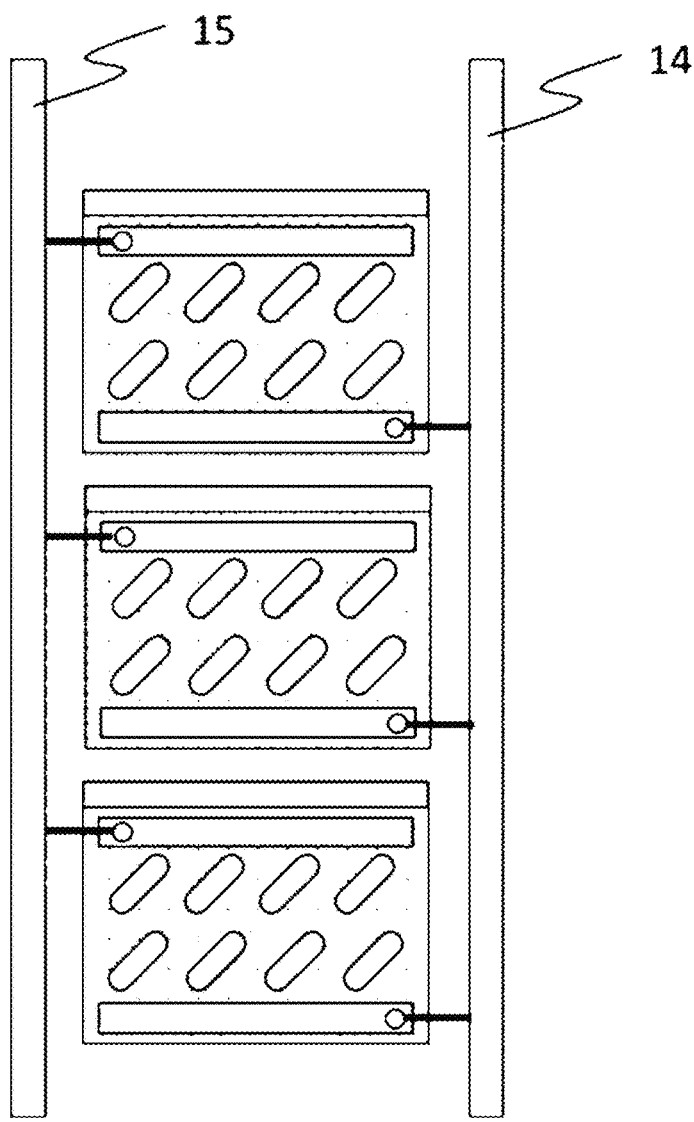
FIG. 4 is a schematic diagram of a stack of heat storage modules.

The heat storage module 3 included in the heat exchange apparatus 1 according to Embodiment 1 will now be concretely described. FIG. 2 is a schematic front view of the heat storage module 3. FIG. 3 is a schematic side view of the heat storage module 3. FIG. 4 is a schematic diagram illustrating a stack of heat storage modules 3.

In the heat exchange apparatus 1 according to Embodiment 1, each heat storage module 3 has the heat-exchange-water inlet 9 and the heat-exchange-water outlet 10 arranged in one side face. The multiple heat storage modules 3 having such a structure are stacked vertically. In the stack of heat storage modules 3, the heat-exchange-water inlet 9 of one heat storage module 3 is connected to the heat-exchange-water inlet 9 of another heat storage module 3 by the inlet pipe 14 extending vertically. In the stack of heat storage modules 3, the heat-exchange-water outlet 10 of one heat storage module 3 is connected to the heat-exchange-water outlet 10 of another heat storage module 3 by the outlet pipe 15 extending vertically.

In the heat exchange apparatus 1 according to Embodiment 1, the regenerative heat exchanger 4 includes the multiple heat transfer tubes 18 meandering vertically and arranged horizontally side by side in a staggered pattern. The regenerative heat exchanger 4 further includes a distribution header pipe 16 and a junction header pipe 17, which extend horizontally and are arranged adjacent to the side face having the heat-exchange-water inlet 9 and the heat-exchange-water outlet 10. In each heat storage module 3, the multiple heat transfer tubes 18 arranged horizontally side by side are connected to the heat-exchange-water outlet 10 by the junction header pipe 17, and are connected to the distribution header pipe 16 by the heat-exchange-water inlet 9.

The above structure of the regenerative heat exchanger 4 causes the tap water entering the heat-exchange-water inlet 9 toward the heat transfer tubes 18 of the regenerative heat exchanger 4 to be distributed to the multiple heat transfer tubes 18 through the distribution header pipe 16 extending horizontally. After being distributed, tap-water streams flow through the respective heat transfer tubes 18, which meander vertically relative to a direction of flow of the tap-water streams, flow back and forth horizontally, and flow from a lower level to a higher level while exchanging heat with the heat storage material. The tap-water streams subjected to heat exchange enter the junction header pipe 17 and join together. Then, the tap water flows through the heat-exchange-water outlet 10. In each heat storage module 3, therefore, thermal stratification is formed such that lower part of the heat storage material 2 is cold and upper part of the heat storage material 2 is warm.

At a low temperature, the heat storage material 2 typically shrinks and increases in density, resulting in lower flowability. To deal with shrinkage of the heat storage material 2 caused by temperature reduction, an air space is provided in the heat storage module 3 such that the heat storage module 3 is not completely filled with the heat storage material 2.

Lower flowability of the heat storage material 2 caused by temperature reduction may cause the heat storage material 2 to extend horizontally in one heat storage module 3 and form a blockage. If a blockage is formed in one heat storage module 3, the heat storage material 2 located vertically above the blockage can shrink because of the presence of an air space. However, the heat storage material 2 located under the blockage is likely to fail to shrink properly because no air space may be located vertically below the blockage. If the heat storage material 2 fails to shrink properly, the heat exchange efficiency of the one heat storage module 3 may decrease. For this reason, the heat exchange apparatus 1 according to Embodiment 1 is configured as follows. The heat-exchange-water inlet 9 is located vertically below the heat-exchange-water outlet 10 so that lower part of the heat storage material 2 in each heat storage module 3 is cold and so that upper part of the heat storage material 2 in each heat storage module 3 is warm.

The above structure of the regenerative heat exchanger 4 makes it easy to design the heat storage modules 3 so that a passage length between the inlet pipe 14 and the outlet pipe 15 of one heat storage module 3 is equal to that of another heat storage module 3. This can equalize the heat exchange efficiencies of the multiple heat storage modules 3. Therefore, the heat exchange apparatus 1 can be easily changed in design to achieve intended heat storage performance.

The heat exchange apparatus 1 according to Embodiment 1 further includes a mixing valve 5. The mixing valve 5 is a valve to adjust the temperature of hot water to be supplied by mixing high-temperature tap water flowing from the heat-exchange-water outlets 10 of the regenerative heat exchangers 4 with low-temperature tap water entering the housing 11 through the tap water inlet 12, and is disposed in the housing 11. The mixing valve 5 is made of, for example, a heat-resistant metallic material, such as stainless steel, aluminum, or copper, or a highly heat-resistant, lightweight material, such as plastic or resin.

The heat exchange apparatus 1 according to Embodiment 1 further includes a control board 6. The control board 6 is a board that performs, for example, control for adjusting flow rates through devices and an operating temperature. The control board 6 transmits a control signal to a component, for example, the mixing valve 5. The control board 6 is disposed in the housing 11, and is made of a lightweight, highly processable material, such as phenol, epoxy, glass, or plastic.

The heat exchange apparatus 1 according to Embodiment 1 further includes a flow control valve 7. The flow control valve 7 is a valve that, for example, blocks supply of hot water or regulates the flow rate of hot water. The flow control valve 7 is located downstream of the mixing valve 5 and is disposed outside the housing 11. The flow control valve 7 is made of a metallic material, such as stainless steel, aluminum, or copper, or a lightweight material, such as plastic or resin.

The housing 11 in Embodiment 1 contains the multiple heat storage modules 3, the mixing valve 5, the control board 6, the inlet pipe 14, and the outlet pipe 15. The heat storage modules 3 having the same shape and the same orientation are arranged vertically adjacent to a first side of the housing 11. For example, the mixing valve 5 and the control board 6 are arranged adjacent to a second side of the housing 11. The tap water flows into and out of the housing 11 through the inlet pipe 14, the outlet pipe 15, and the tap water inlet 12 and the tap water outlet 13, which are connected by the mixing valve 5.

A tap water pressure of approximately 0.3 to approximately 0.5 MPa is typically applied to a tap water line. Substantially the same tap water pressure is also applied to the tap water flowing through the heat exchange apparatus 1. For this reason, the flow control valve 7 located on a downstream side of the heat exchange apparatus 1 is opened to supply hot water. When the flow control valve 7 is opened, the tap water pressure causes the tap water to enter the passage in the housing 11 through the tap water inlet 12. Then, the tap water exchanges heat with the heat storage material 2 in each of the heat storage modules 3. The tap water subjected to heat exchange flows out of the housing 11 through the tap water outlet 13 and is then supplied as hot water.

For hot water supply, the heat exchange apparatus 1 according to Embodiment 1 causes the tap water to enter the tap water inlet 12 and then be divided into streams, one of the streams flowing through the inlet pipe 14 connecting the tap water inlet 12 to the heat-exchange-water inlets 9 of the respective heat storage modules 3, the other one of the streams flowing through a direct pipe 19 connecting the tap water inlet 12 directly to the mixing valve 5.

The heat exchange apparatus 1 according to Embodiment 1 controls the tap water flowing through the inlet pipe 14 so that the tap water flows through each regenerative heat exchanger 4, exchanges heat with the heat storage material 2 heated at a high temperature by a heat source, receives heat from the heat storage material 2, and flows through the heat-exchange-water outlet 10 and then through the outlet pipe 15 to the mixing valve 5. For the heat source used to heat the tap water, the heat exchange apparatus 1 may use heat from air in a heat pump, heat from an electric heater, or waste heat from a factory, for example.

The heat exchange apparatus 1 according to Embodiment 1 uses the mixing valve 5 to mix high-temperature tap water heated and entering the mixing valve 5 through the outlet pipe 15 with low-temperature tap water flowing from the tap water inlet 12 directly into the mixing valve 5 through the direct pipe 19. In the case where a user sets a target hot water temperature, the heat exchange apparatus 1 causes the control board 6 to control the components including the mixing valve 5 to provide hot water at the set target temperature. The heat exchange apparatus 1 causes the control board 6 to adjust the temperature of hot water by changing the ratio of high-temperature tap water to low-temperature tap water. Thus, the user can use the temperature-adjusted tap water for a shower, hot water supply, or other purposes.

In the above-described example of the heat exchange apparatus 1 according to Embodiment 1, the heat-exchange-water inlets 9 and the heat-exchange-water outlets 10 are used, and the heat storage material 2 transfers heat to the tap water flowing through the passage in the heat exchange apparatus 1 to heat the water. The heat exchange apparatus 1, however, can switch between fluids by using the control board 6 so that the heat storage material 2 receives heat from the heat medium flowing through the passage in the heat exchange apparatus 1 to store the heat. The control board 6 functions as a switching unit to switch between a high-temperature fluid having a higher temperature than the heat storage material and a low-temperature fluid having a lower temperature than the heat storage material, the high-temperature fluid or the low-temperature fluid serving as a fluid exchanging heat with the heat storage material.

For the heat storage material 2 in the heat exchange apparatus 1 according to Embodiment 1, each heat storage module 3 contains a latent heat storage material that repeatedly undergoes phase change between solid and liquid states at a temperature ranging from 40 to 90 degrees C., which are typically used as hot water temperatures. Such a configuration avoids tap water pressure to improve durability and allows the housing 11 to have a smaller volume than that in the use of another heat storage material that undergoes phase change at or below 40 degrees C., for example, water. The reason is as follows. In the use of another heat storage material that undergoes phase change at or below 40 degrees C., for example, water, the heat storage material undergoes phase change at a fixed temperature, so that a temperature at the outlet of the heat storage module 3 is at or below 40 degrees C.

For the heat storage material 2 in the heat exchange apparatus 1 according to Embodiment 1, each heat storage module 3 contains the latent heat storage material that repeatedly undergoes phase change between solid and liquid states at a temperature ranging from 40 to 90 degrees C., which are typically used as hot water temperatures. Such a configuration avoids tap water pressure to improve durability and allows the housing 11 to have a smaller volume than that in the use of another heat storage material that undergoes phase change at or above 100 degrees C., for example, metal or saccharide. The reason is as follows. In the use of another heat storage material that undergoes phase change at or above 100 degrees C., for example, metal or saccharide, tap water exchanging heat with the material boils at 100 degrees C., thus providing an excessive amount of heat.

In the heat exchange apparatus 1 according to Embodiment 1, as is clear from FIGS. 3 and 4, the heat-exchange-water inlet 9 and the heat-exchange-water outlet 10 of the regenerative heat exchanger 4 are arranged in one side face of each heat storage module 3. The heat exchange apparatus 1 includes the stack of heat storage modules 3, which are rectangular, each having the heat-exchange-water inlet 9 and the heat-exchange-water outlet 10 arranged in one side face as described above. The multiple heat-exchange-water inlets 9 are aligned. This alignment facilitates installation of the inlet pipe 14, leading to a smaller volume of the pipe. Additionally, the multiple heat-exchange-water outlets 10 are aligned in the heat exchange apparatus 1. This alignment facilitates installation of the outlet pipe 15, leading to a smaller volume of the pipe.

A typical heat exchange apparatus including a cylindrical tank includes a pressure reducing valve that reduces the pressure of tap water entering the heat exchange apparatus so that the cylindrical tank can withstand the tap water pressure. In the typical heat exchange apparatus including the pressure reducing valve, a reduction in pressure of incoming tap water may result in a reduction in flow rate of hot water to be supplied. In contrast, the heat exchange apparatus 1 according to Embodiment 1 includes the heat storage modules 3 having the heat storage material 2, instead of having a structure with a cylindrical tank storing water. This eliminates the need of a pressure reducing valve to reduce the pressure of incoming tap water. Advantageously, this readily achieves an intended flow rate of hot water to be supplied.

For installation of the heat exchange apparatus 1 according to Embodiment 1 at a target place, the heat storage modules 3 are individually transported to the target place. The transported heat storage modules 3 can be stacked to form a stack at the target place. Additionally, the inlet pipe 14, the outlet pipe 15, the direct pipe 19, and other parts are attached to the stack of heat storage modules 3 at the target place. These components are assembled into the heat exchange apparatus 1. Thus, the heat exchange apparatus 1 can be installed at the target place. Advantageously, the heat exchange apparatus 1 has greater portability and higher assembly efficiency than a typical heat exchange apparatus including a cylindrical tank.

In the heat exchange apparatus 1 according to Embodiment 1, the inlet pipe 14, the outlet pipe 15, and the direct pipe 19 are arranged in the housing 11 and are located adjacent to one side of the housing 11. Advantageously, this arrangement leads to better maintenance of the apparatus than that of a heat exchange apparatus including the inlet pipe 14, the outlet pipe 15, and the direct pipe 19 arranged at random in the housing 11.

In the above-described example, the heat exchange apparatus 1 according to Embodiment 1 heats tap water. The present disclosure, however, is not limited to this example. For example, the heat exchange apparatus 1 may be configured to heat a liquid medium different from tap water.

The present disclosure is not limited to the specific details and representative embodiments shown and described above. Further modifications and advantages that can be readily derived by those skilled in the art are also included in the present disclosure. Accordingly, various modifications and changes can be made without departing from the spirit or scope of the general inventive concept defined by the appended claims and their equivalents.

REFERENCE SIGNS LIST

1: heat exchange apparatus, 2: heat storage material, 3: heat storage module, 4: regenerative heat exchanger, 5: mixing valve, 6: control board, 7: flow control valve, 8: heat-storage-material inlet, 9: heat-exchange-water inlet, 10: heat-exchange-water outlet, 11: housing, 12: tap water inlet, 13: tap water outlet, 14: inlet pipe, 15: outlet pipe, 16: distribution header pipe, 17: junction header pipe, 18: heat transfer tube, 19: direct pipe

The invention claimed is:

1. A heat exchange apparatus that exchanges heat between a latent heat storage material and a fluid, the heat exchange apparatus comprising:
   a first heat storage module and a second heat storage module each having the latent heat storage material and a box shape; and
   a housing containing the first heat storage module and the second heat storage module each having the box shape,
   wherein the first heat storage module and the second heat storage module each having the latent heat storage material are disposed so as to be oriented in the same direction and be stacked vertically,
   wherein the first heat storage module includes a first inlet that guides the fluid, which is guided from outside of the housing into the housing, into the first heat storage module,
   wherein the second heat storage module includes a second inlet that guides the fluid, which is guided from outside of the housing into the housing, into the second heat storage module,
   wherein the first inlet and the second inlet are arranged in a same side of an aggregate including the first and second heat storage modules arranged in the same orientation and are connected to an inlet pipe extending vertically,
   wherein the first heat storage module includes a first outlet that guides the fluid guided into the first heat storage module to outside of the first heat storage module,
   wherein the second heat storage module includes a second outlet that guides the fluid guided into the second heat storage module to outside of the second heat storage module, and
   wherein the first outlet and the second outlet are arranged in the same side of the aggregate and are connected to an outlet pipe extending vertically, the inlet pipe and the outlet pipe being arranged adjacent to the same side of the aggregate.

2. The heat exchange apparatus of claim 1, further comprising:
   a housing inlet that guides the fluid from outside of the housing into the housing, wherein the housing inlet is connected to the first inlet and the second inlet.

3. The heat exchange apparatus of claim 1, further comprising:
   a housing outlet that guides the fluid guided into the housing to outside of the housing,
   wherein the housing outlet is connected to the first outlet and the second outlet.

4. The heat exchange apparatus of claim 1, further comprising:
   a control board configured to switch between a high-temperature fluid having a higher temperature than the latent heat storage material and a low-temperature fluid having a lower temperature than the latent heat storage material, the high-temperature fluid or the low-temperature fluid serving as the fluid exchanging heat with the latent heat storage material.

5. The heat exchange apparatus of claim 1, wherein the latent heat storage material is isolated from the fluid.

6. A method of manufacturing a heat exchange apparatus that exchanges heat between a latent heat storage material and a fluid, the method comprising:
   a module preparing step of preparing a first heat storage module and a second heat storage module each having the latent heat storage material and a box shape;
   a housing preparing step of preparing a housing to contain the first heat storage module and the second heat storage module each having the box shape; and
   an arranging step of arranging the prepared first and second heat storage modules each having the latent heat storage material vertically in a same orientation in the housing,
   wherein an inlet for each of the prepared first and second heat storage modules and an outlet for each of the prepared first and second heat storage modules are arranged in a same side of the aggregate including the first and second heat storage modules arranged in the same orientation, wherein an inlet pipe connected to each inlet extends vertically and an outlet pipe connected to each outlet extends vertically, wherein the inlet pipe and the outlet pipe are arranged adjacent to the same side of the aggregate.

* * * * *